G. A. & W. M. KRAUTTER.
SPRING TIRE FOR AUTOMOBILES OR OTHER VEHICLES.
APPLICATION FILED JULY 21, 1911.
1,047,538.
Patented Dec. 17, 1912.
2 SHEETS—SHEET 1.
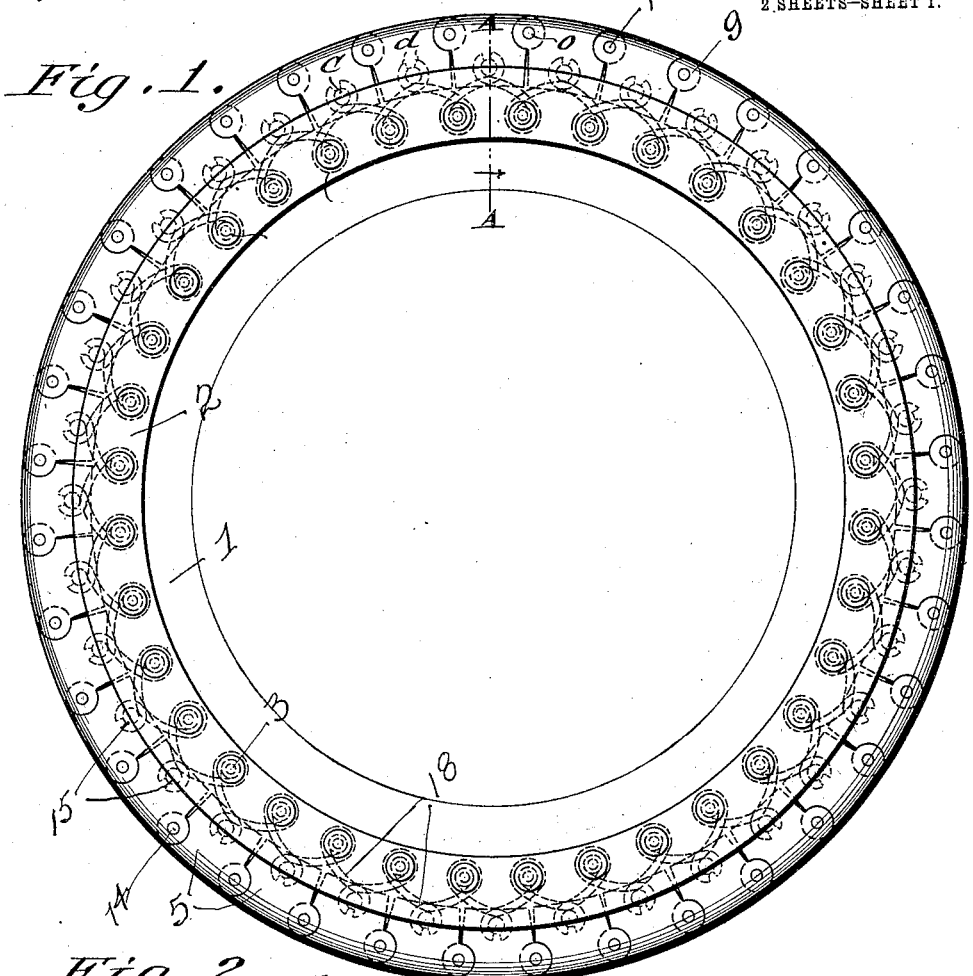
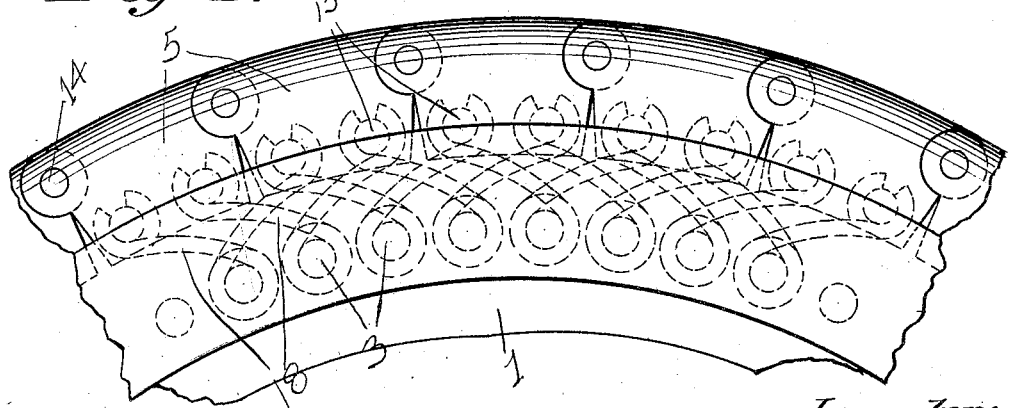
Witnesses:
Harry Wilhelm
Henry Gmeser
Inventor:
Gottlieb A. Krautter
William M. Krautter G. A. & W. M. KRAUTTER.
SPRING TIRE FOR AUTOMOBILES OR OTHER VEHICLES.
APPLICATION FILED JULY 21, 1911.

1,047,538.

Patented Dec. 17, 1912.

2 SHEETS—SHEET 2.

Witnesses:
Harry Wilhelm
Henry Grieser

Inventor:
Gottlieb G. Krautter
William M. Krautter

UNITED STATES PATENT OFFICE.

GOTTLEIB A. KRAUTTER AND WILLIAM M. KRAUTTER, OF MARION, OHIO.

SPRING-TIRE FOR AUTOMOBILES OR OTHER VEHICLES.

1,047,538.

Specification of Letters Patent. Patented Dec. 17, 1912.

Application filed July 21, 1911. Serial No. 639,863.

*To all whom it may concern:*

Be it known that I, GOTTLEIB A. KRAUTTER and WILLIAM M. KRAUTTER, citizens of the United States, residing in Marion, in the county of Marion and the State of Ohio, have invented a Spring-Tire for Automobiles and other Vehicles, of which the following is a specification.

The present invention relates to a spring tire designed to be used upon automobiles or other vehicles in the place of the ordinary pneumatic tire.

An important object of this invention is to provide a tire of the above mentioned character which will possess the desired degree of elasticity and yet will not be liable to punctures or other derangements to which the ordinary pneumatic tire is liable.

A further object of this invention is to provide a device of the above mentioned character which is simple in construction, strong, and cheap to manufacture.

Other objects and advantages of the invention will be apparent during the course of the following description.

Figure 3:
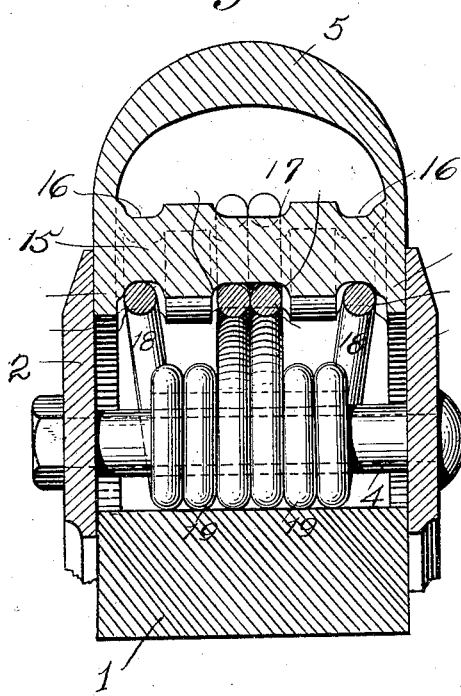
Figure 4:
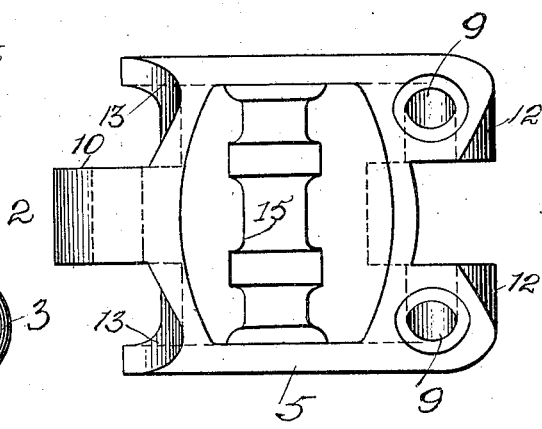
Figure 5:
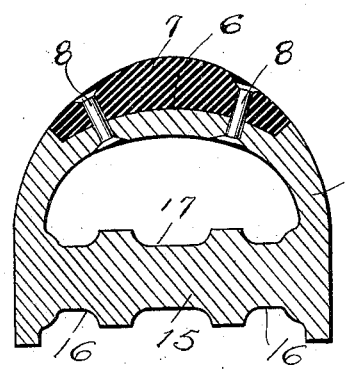
Figure 6:
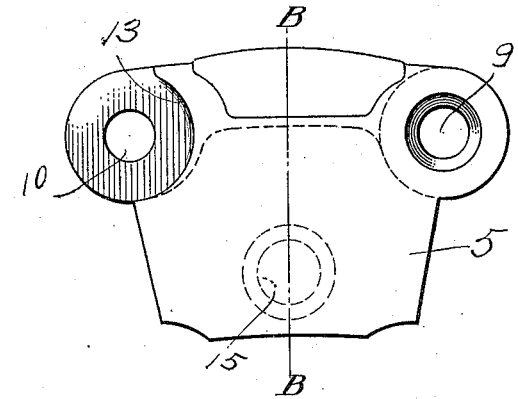

In the accompanying drawings forming a part of this specification and in which like numerals are employed to designate like parts throughout the same, Figure 1 is a side view of my complete tire, Fig. 2 is an enlarged fragmentary view of a portion of my tire showing a slightly different construction, Fig. 3 is an enlarged transverse sectional view taken on line A—A of Fig. 1, Fig. 4 is a bottom plan view of one of the links, of a slightly different construction from that shown in Fig. 3, Fig. 5 is a transverse sectional view through the same taken on line B—B of Fig. 6, and Fig. 6 is a side view of the same.

In the drawings wherein is illustrated a preferred embodiment of my invention, the numeral 1 designates a felly of the wheel, upon the opposite sides of which are spaced metallic rings 2. These rings are held in place upon the felly 1 by transverse bolts 3, which carry between the rings 2, spacing sleeves 4, as shown.

My improved tire further comprises a suitable number of metallic link sections 5, which are curved in cross-section, as shown, to conform generally to the ordinary shape of a pneumatic tire. The metallic link sections 5 may have their tread portions formed smooth, as shown in Figs. 1 to 3 inclusive, or they may be provided with recesses 6, to receive a block of rubber 7 or the like, held in place by pins or rivets 8, as shown.

Each of the link sections 5 is provided upon one end with spaced apertured knuckles 9, and upon its opposite end with a single apertured knuckle 10, it being understood that the knuckle 10 of one section fits between the knuckles 9 of the succeeding link section. The apertured knuckles 9 have their ends curved or rounded as shown at 12 and each link section 5 is provided near its knuckle 10 with sockets 13 for receiving the knuckles 12 of the succeeding link section. These link sections are pivotally connected near their outer portions by pintles 14, which pass through the apertured knuckles 9 and 10, as shown.

Each of the metallic link sections 5 is provided internally thereof near its lower edge and midway between the ends thereof with a horizontal transverse anchor-element 15 provided with outer and inner grooves 16 and 17, as shown.

Attention is called to the fact that the bolts 3 are disposed near the ends of the link sections 5, as shown. The numeral 18 designates approximately U-shaped springs having their intermediate portion bent about the spacing sleeve 4 in the form of coils 19. Corresponding outer ends of these springs 18 are hooked and engage within the grooves 16 of the anchor-element 15 of the succeeding link section 5, while corresponding inner ends of the springs 18 are hooked and engage within the grooves 17 of the anchor-element 15 of the preceding link section 5. The link sections are flexibly connected by virtue of their hinged joints and are yieldingly connected and supported by the springs 18, the coils or turns 19 of the springs 18 being disposed directly upon the felly 1 whereby the load is directly transmitted to the felly and taken off of the spacing sleeve 4, it being understood that the diameter of the coils or turns 19 are made considerably larger than the diameter of the spacing sleeve 4.

The form of my invention shown in Fig. 2 is just like that shown in Fig. 1 except that I have doubled the number of anchor-elements 15, springs 18, and transverse bolts 3.

From the foregoing description it is obvious that I have provided a metallic tire which is highly elastic, strong and durable. The different parts of this tire may be quickly and easily separated and assembled for the purpose of repairing or the like.

It is to be understood that the form of my invention herewith shown and described, is to be taken as a preferred example of the same, and that certain changes in the size, shape and arrangement of parts may be resorted to without departing from the spirit of my invention or the scope of the subjoined claims.

Having thus described my invention, I claim:

1. The combination with the felly of a wheel, of rings mounted upon the opposite sides of the felly and extending outwardly beyond the same, a plurality of hollow tire-sections hinged together at their ends to form a flexible annulus disposed between said rings, anchor elements disposed entirely within the hollow tire-sections and rigidly connecting the opposite side walls of the same, bolts passing through the rings, and approximately U-shaped springs having their intermediate portions coiled about said bolts and their two free end portions engaging said anchor elements.

2. The combination with the felly of a wheel, of rings mounted upon the opposite sides of the felly and extending outwardly beyond the same, a plurality of hollow tire-sections disposed between the rings and having their closed sides disposed outermost and their open sides innermost, a horizontal anchor element disposed entirely within said hollow tire-sections to rigidly connect the side walls of the same, means forming a hinge-connection between the adjacent ends of each pair of tire-sections, a bolt disposed near such adjacent ends and passing through the rings, and an approximately U-shaped spring having its intermediate portion coiled about the bolt, one free end engaging the anchor element of the preceding tire-section and the opposite free end engaging the anchor element of the succeeding tire-section.

3. The combination with the felly of a wheel, of rings mounted upon opposite sides thereof and extending outwardly therebeyond, a plurality of pivoted hollow tire-sections formed approximately U-shaped in cross-section, having their closed sides disposed outermost and their open sides innermost between said rings, a horizontal anchor element disposed entirely within each hollow tire-section midway between the ends thereof and provided with spaced grooves, a bolt passing through the rings at the adjacent ends of each pair of the tire-sections and suitably spaced from the felly, and an approximately U-shaped spring having its intermediate portion coiled about the bolt, one free end thereof engaging in a groove on the anchor element of the preceding tire-section of said pair and the opposite free end engaging in the groove on the anchor element of the succeeding tire-section of the same pair, the intermediate coiled portion of the spring having its turns of considerably greater diameter than the bolt, whereby said turns engage the felly to transmit pressure to the same instead of to said bolt.

GOTTLEIB A. KRAUTTER.
WILLIAM M. KRAUTTER.

Witnesses:
HARRY WILHELM,
HENRY GRUESER.

---

Copies of this patent may be obtained for five cents each, by addressing the "Commissioner of Patents, Washington, D. C."